Sept. 20, 1932.  B. B. BLUNDELL  1,878,574

PISTON CONSTRUCTION

Filed Nov. 20, 1931

INVENTOR,
Beatrice B. Blundell,
BY F. E. Maynard
ATTORNEY.

Patented Sept. 20, 1932

1,878,574

UNITED STATES PATENT OFFICE

BEATRICE B. BLUNDELL, OF LOS ANGELES, CALIFORNIA

PISTON CONSTRUCTION

Application filed November 20, 1931. Serial No. 576,308.

This invention relates to trunk pistons and especially to ball-and-socket piston structure wherein the connecting link is attached to the piston by means of a ball-and-socket joint.

It is an object of the present invention to provide a simple, substantial, practicable and long-life ball-and-socket link and piston means.

A further object is to provide a trunk piston with an inner liner on its head for co-operation of a mutual ball-end of a connecting link associated with the crank-shaft of a motor and in this connection an object is to provide means for the provision of a ball bearing top liner of a highly efficient metal of the bronze class, whereas, the piston shell may be of a different metal such, for instance, as aluminum.

Further it is an object to provide means for the conversion of common wrist-pin pistons into a ball-and-socket type.

Other objects, advantages and details of construction and the combination will be made manifest in the ensuing description of the herewith illustrative embodiment; it being understood that modifications, variations, and adaptations, may be resorted to within the spirit, scope, and principle of the invention as it is more particularly hereinafter claimed.

Figure 1:
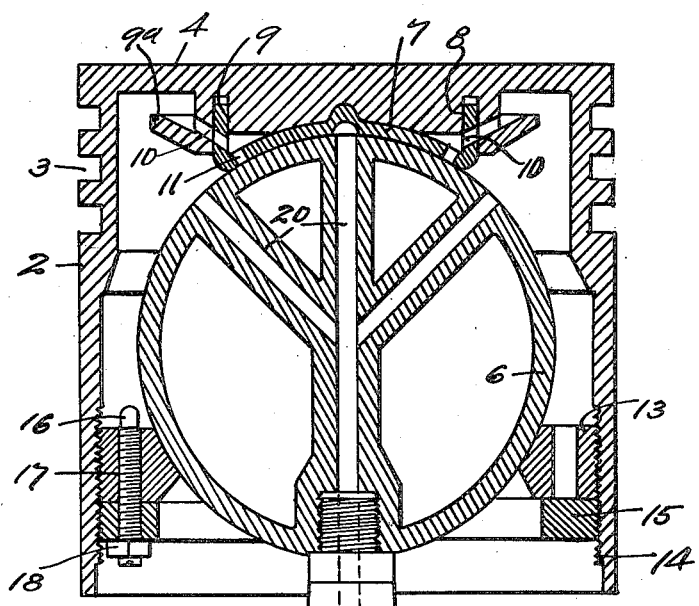
Figure 1 is an axial section of one adaptation of the invention.
Figure 2:
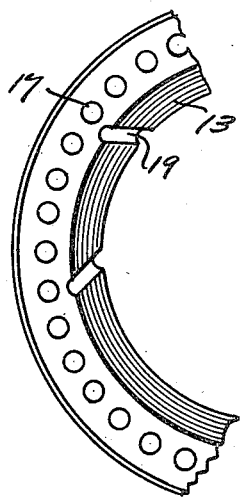
Figure 2 is a plan of a portion of a ring-bearing.
Figure 3:
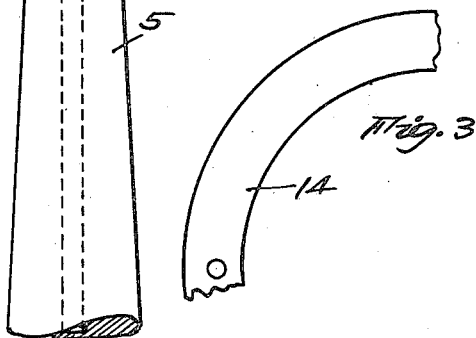
Figure 3 is a plan of a portion of a lock-ring.

The present invention is shown as incorporating a piston shell 2 with the usual packing grooves 3 and a head 4. A feature of this invention resides in the provision of means for mounting a ball-end connecting rod 5 to the piston.

Such means is illustrated as including an inner liner in the form of a metal stamping of concavo-covex form presenting a seat or bearing 7 of disc shape and provided with an upturned flange 8 complementary to an annular channel 9 cut therefor in the head 4 of the piston. In this manner the bearing liner 7 is centrally and securely positioned to receive the ball 6.

The inner liner 7 may be applied to conventional wrist pin pistons or it may be adapted to special pistons prepared therefor and in which case the special piston is formed with a trough flange 9 to receive oil which may flow through ducts 10 to the liner 7 which is provided with holes 11 opening to the adjacent ball surface.

For the purpose of adjusting the ball with the desired degree of play against the bearing liner 7 a suitable retaining means is provided and is shown as including a ring-bearing 13 screwed into internal threads 14 cut in the open end of the piston 2. In application the ball 6 is introduced into the piston to bear against the liner 7 and the ring-bearing 13 is screwed home to advance the ball with desired pressure against the liner 7 after which the ring-bearing is locked by a lock-ring 15 engaging the threads 14. To prevent loosening of the lock-ring 15 it is secured to the ring-bearing 13 as by a key-screw 16 passing through the lock-ring 15 and engaging one or another of a series of key holes 17 in the bearing ring 13. A lock-nut 18 run onto the key screw 16 serves to lock the key screw in place.

The key holes 17 also serve for engagement of a spanner wrench by which the ring-bearing 13 may be screwed into place. The ball receiving surface of the ring-bearing 13 is provided with a plurality of oil grooves 19.

The ball 6 is here shown as of hollow form and has a central web 20 with branches 21 all being hollow and forming conduits for conveying oil from the hollow rod 5 to the exterior surface of the ball to insure positive lubrication when desired.

What is claimed is:

1. A trunk piston having a head provided with an annular channel in its inner face, and a ball bearing liner having a flange fitting said channel.

2. A trunk piston having a head provided with an annular channel in its inner face, and a ball bearing liner having a flange fitting said channel, and an oil collecting trough having ducts leading to the liner and the latter having ports to the bearing surface.

3. A trunk piston having a head, an inner head liner having a rim flange sunk in said head, a ring-bearing having a ball receiving top face which is provided with oil channels, a connecting rod-ball adjusted to said liner by said ring, and means for fixing the ring in adjusted position.

BEATRICE B. BLUNDELL.